US010231390B2

(12) United States Patent
Miller

(10) Patent No.: US 10,231,390 B2
(45) Date of Patent: Mar. 19, 2019

(54) IRRIGATION SYSTEM WITH VARIABLE GEAR RATIO TRANSMISSIONS

(71) Applicant: LINDSAY CORPORATION, Omaha, NE (US)

(72) Inventor: Mark William Miller, Elkhorn, MO (US)

(73) Assignee: Lindsay Corporation, Omaha, NE (US)

( * ) Notice: Subject to any disclaimer, the term of this patent is extended or adjusted under 35 U.S.C. 154(b) by 146 days.

(21) Appl. No.: 15/163,162

(22) Filed: May 24, 2016

(65) Prior Publication Data
US 2017/0339851 A1 Nov. 30, 2017

(51) Int. Cl.
*A01G 25/09* (2006.01)
*F16H 9/04* (2006.01)

(52) U.S. Cl.
CPC ............ *A01G 25/092* (2013.01); *F16H 9/04* (2013.01); *A01G 25/09* (2013.01)

(58) Field of Classification Search
CPC ...... A01G 25/092; A01G 25/09; B05B 12/08; F16H 3/72; F16H 9/04; F16H 9/26
USPC .................................................. 239/722–754
See application file for complete search history.

(56) References Cited

U.S. PATENT DOCUMENTS

| 3,044,316 | A | * | 7/1962 | Forster | ...................... | F16H 9/12 |
| | | | | | | 474/12 |
| 4,133,344 | A | * | 1/1979 | Hunter | ................. | A01G 25/092 |
| | | | | | | 239/728 |
| RE31,838 | E | * | 2/1985 | Seckler | ................ | A01G 25/092 |
| | | | | | | 239/729 |
| 6,755,362 | B2 | * | 6/2004 | Krieger | ................ | A01G 25/092 |
| | | | | | | 239/731 |
| 7,963,110 | B2 | | 6/2011 | Bollinger et al. | | |
| 2003/0153426 | A1 | | 8/2003 | Brown | | |
| 2012/0283909 | A1 | | 11/2012 | Dix | | |
| 2013/0043332 | A1 | * | 2/2013 | Korus | .................... | B62D 55/08 |
| | | | | | | 239/723 |
| 2013/0048747 | A1 | * | 2/2013 | Pfrenger | .............. | A01G 25/092 |
| | | | | | | 239/1 |

OTHER PUBLICATIONS

T-L Irrigation Testimonial by Rich Knight: http://tlirr.com/blog/testimonial/rich-knight/.

* cited by examiner

*Primary Examiner* — Steven J Ganey
*Assistant Examiner* — Tuongminh Pham
(74) *Attorney, Agent, or Firm* — Hovey Williams LLP

(57) ABSTRACT

A center-pivot irrigation system having mobile towers interconnected by spans actuatable about a center-pivot, constant speed motors for each of the mobile towers, and variable gear ratio transmissions each driven by one of the constant speed motors and each driving one of the mobile towers. The irrigation system may also include a control system sending command signals to the variable gear ratio transmissions, independently increasing or decreasing a speed of the mobile towers via the variable gear ratio transmissions. The irrigation system may also include a sensors for providing alignment information regarding the spans to the control system. The control system may independently command the transmissions to speed up or slow down one of the mobile towers relative to alignment information received from the sensors.

8 Claims, 3 Drawing Sheets

IRRIGATION SYSTEM WITH VARIABLE GEAR RATIO TRANSMISSIONS

BACKGROUND

Irrigation systems are frequently used to deposit water and/or pesticides throughout a field of crops. A typical irrigation system includes multiple spans linked together and moved through the field on frame pieces or "mobile towers" having wheels. A center-pivot irrigation system moves in a circle or semi-circle about a center-pivot while a lateral-move irrigation system moves along a generally straight line across a generally-square or rectangular-shaped field.

Many irrigation systems are designed to automatically adjust the alignment of the spans relative to each other and/or relative to the center-pivot as the spans move across a field. For example, it may be desirable to adjust alignment of one or more spans to relieve stress in the pipe carried by the spans, caused by an uneven grade, or to cause one or more spans to wrap or swing around obstacles in a path of the irrigation system.

Some center-pivot irrigation systems use constant speed motors with on/off duty cycles for movement of mobile towers to adjust span alignment. Alternatively, when constant motion is required, an irrigation system may use variable frequency drives (VFD) or a hydraulic drive pivot to variably speed up or slow down any one of the mobile towers. However, both of these solutions can be expensive and difficult to install.

SUMMARY

Embodiments of the present invention solve the above described problems by providing an irrigation system utilizing a plurality of variable gear ratio transmissions for varying travel speed of the irrigation system's mobile towers. An embodiment of the irrigation system includes a plurality of mobile towers interconnected by a plurality of spans, a plurality of motors for driving the mobile towers, a plurality of variable gear ratio transmissions variably controlling speed of the mobile towers, and a control system communicably coupled to the variable gear ratio transmissions. Each of the variable gear ratio transmissions may be driven by one of the motors and may each independently drive one of the mobile towers in a forward or rearward direction. The control system may command signals to the variable gear ratio transmissions for increasing or decreasing speed of one or more of the mobile towers.

In another embodiment of the invention, a center-pivot irrigation system includes a center pivot, mobile towers for moving about the center pivot, elongated rigid spans extending between and connected to adjacent ones of the mobile towers, constant speed electric motors, variable gear ratio transmissions, and a control system. The constant speed electric motors and variable gear ratio transmissions may each be mechanically coupled with each other on one of the mobile towers for driving the mobile towers forward or aftward. Specifically, the variable gear ratio transmissions may each be driven by one of the constant speed electric motors and may drive one of the mobile towers at varying speeds. The variable gear ratio transmissions may include continuously variable transmissions (CVTs), continuously variable planetary gear transmissions, stepless transmissions, and/or variable pulley transmissions. The control system may send command signals to the variable gear ratio transmissions, thereby independently increasing or decreasing speed of the mobile towers via the variable gear ratio transmissions.

In yet another embodiment of the invention, a center-pivot irrigation system includes a center pivot, mobile towers for moving about the center pivot, elongated rigid spans extending between and connected to adjacent ones of the mobile towers, a fluid delivery system supported by the mobile towers and spans, wheels on which the mobile towers travel, constant speed electric motors, variable gear ratio transmissions, sensors, and a control system. The fluid delivery system may have conduits attached to or integrally formed with the spans and to output water from orifices formed therein or therethrough. The constant speed electric motors and the variable gear ratio transmissions may each be associated with one of the mobile towers. Specifically, each mobile tower may have one of the constant speed electric motors mechanically coupled with one of the variable gear ratio transmissions, and the variable gear ratio transmission may be mechanically coupled with the wheels to drive rotation speed thereof, thus independently moving the mobile towers in a forward or rearward direction. The variable gear ratio transmissions may include continuously variable transmissions (CVTs), continuously variable planetary gear transmissions, stepless transmissions, and/or variable pulley transmissions. The sensors may each be mounted on one of the spans or mobile towers to measure alignment-related attributes of adjacent spans. The control system may be communicably coupled with the sensors and the variable gear ratio transmissions for sending command signals to the variable gear ratio transmissions based on the alignment-related attributes measured by the sensors, thereby independently increasing or decreasing speed of the mobile towers to compensate for span misalignment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
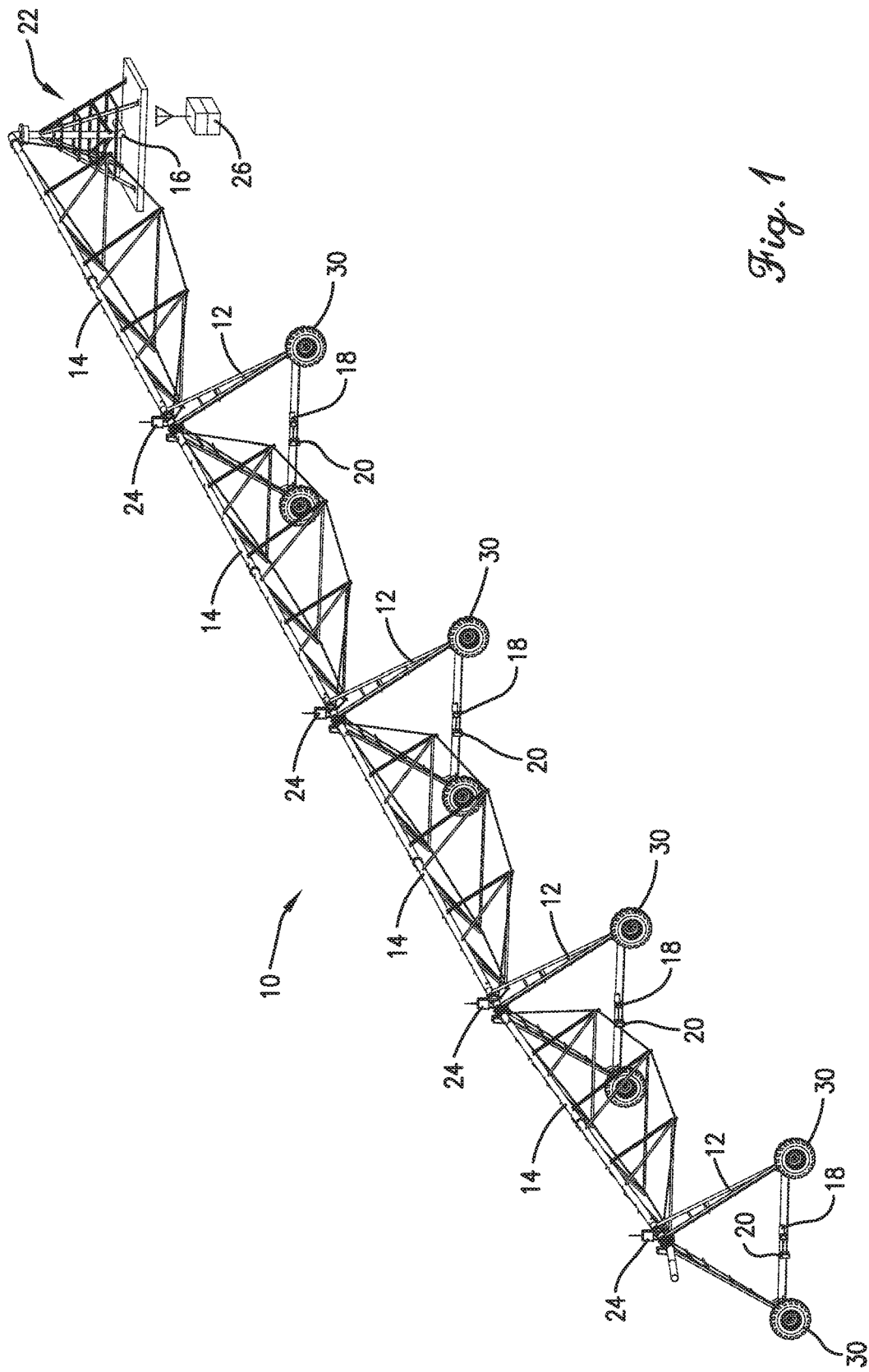
FIG. 1 is a perspective view of a center-pivot irrigation system constructed in accordance with an embodiment of the invention, schematically illustrating variable gear ratio transmissions mounted on each mobile tower.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
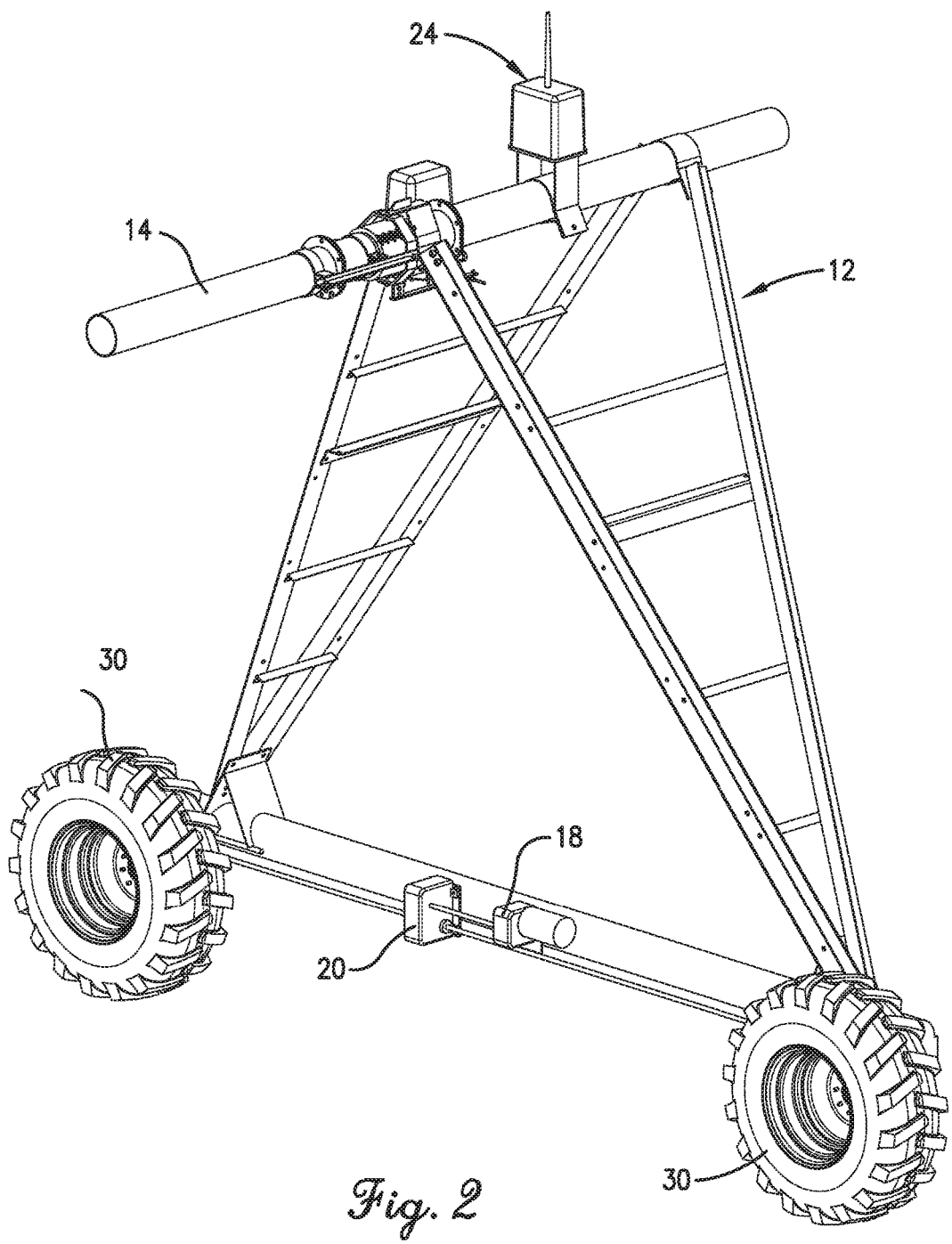
FIG. 2 is a perspective view of one of the mobile towers of FIG. 1 and one of the variable gear ratio transmissions mechanically coupled to wheels thereof.

An irrigation system 10, constructed in accordance with an embodiment of the invention and configured for irrigating a field, is illustrated in FIGS. 1 and 2. The irrigation system 10 broadly comprises a plurality of mobile towers 12 spaced apart from each other, a plurality of spans 14 extending between and supported by the mobile towers 12, a fluid delivery system 16, a plurality of constant speed motors 18 for driving the mobile towers 12 through the field, and a plurality of variable gear ratio transmissions 20 configured for independently varying the speeds at which the mobile towers 12 travel through the field. The irrigation system 10 may be a center-pivot irrigation system having a fixed center pivot 22 or fixed center mobile tower, which serves as a center point about which the other mobile towers 12 and spans 14 rotate or circumscribe completely or partially. Alternatively, the irrigation system 10 may be a lateral-move irrigation system or the like. In some embodiments of the invention, the irrigation system 10 may further comprise a plurality of sensors 24 each mounted in fixed alignment to one of the spans 14 and a control system 26 configured for receiving measurements from the sensors 24 and/or guiding and actuating various elements of the irrigation system 10. The irrigation system 10 may also comprise a power supply (not shown) for providing operational power and/or electricity to any of the motors 18, transmissions 20, sensors 24, and/or the control system 26.

The mobile towers 12, as illustrated in FIG. 1, may each comprise a frame 28 of any shape and one or more wheels 30 rotatably attached to the frame 28. In some embodiments of the invention, the frame 28 of at least some of the mobile towers 12 may be made of one or more rods shaped in a substantially triangular or A-frame configuration having lower leg portions configured for attaching the wheels 30 thereto. Additionally or alternatively, the frame 28 of at least some of the mobile towers 12 may be made of one or more rods shaped in a substantially narrow rectangular shape with leg portions extending horizontally outward and then angled downward therefrom for attaching the wheels 30 thereto.

The mobile tower wheels 30 illustrated and described herein are merely examples of mechanisms for permitting movement of the irrigation system 10. The term "wheel" or "wheels" as used herein may refer to conventional circular wheels, skis, skids, tank tracks and wheels, rollers on a track, or any mechanism on which the mobile towers may travel relative to the ground.

The mobile towers 12 may be spaced apart from each other, and linked together via the spans 14. For example, one of the spans 14 may laterally span a distance between a first mobile tower and a second mobile tower spaced apart from each other. The mobile towers 12 may support the spans 14 a distance above the field. In some embodiments of the invention, the mobile towers 12 may carry the spans 14 along a circular or semi-circular path about the center pivot 22. The irrigation system 10 may comprise any quantity of mobile towers and spans required to cover a desired area of the field.

As illustrated in FIG. 1, the spans 14 may each be elongated structures spanning an entire distance between adjacent ones of the mobile towers 12. Each of the spans 14 may be fixedly or pivotally connected with at least one of the mobile towers 12 and/or each other. In some embodiments of the invention, the spans 14 may be elongated rigid truss structures, booms, conduits pipes, bars, extension arms, or other structures of various configurations. For example, in FIG. 1, the spans include elongated conduits with spreader bars mounted thereto and extending below the elongated conduits. However, the spans 14 may have any shapes and dimensions without departing from the scope of the invention. In some embodiments of the invention, one or more of the spans 14 may be an extension arm 32 or pivoting turret having a first end fixedly or pivotally joined with one of the mobile towers 12 and a second end not joined to the mobile towers 12 or substantially free standing.

The spans 14 may carry or otherwise support portions of the fluid delivery system 16. Specifically, portions of the fluid delivery system 16 may attach to and/or be supported by the spans 14, such that water and/or any other liquid may be dispensed at given intervals along a length of the spans 14. A plurality of sprinkler heads, spray guns, drop nozzles, or other fluid-emitting devices may be spaced along the spans 14 and/or at one or more of the mobile towers 12 to apply water and/or other fluids to the field or land underneath the irrigation system 10.

In some embodiments of the invention, the spans 14 may be integrated with the fluid delivery system 16. For example, each of the spans 14 may comprise rigid pipes or conduits extending an entire distance between two of the mobile towers 12 and in fluid communication with a water source, such that water may flow therethrough. In this embodiment of the invention, the spans 14 may also comprise holes formed therethrough and/or inlets and outlets for dispensing water or any other liquid desired to be applied to the field.

The fluid delivery system 16 may comprise one or more conduits and one or more fluid-emitting devices (not shown), such as sprinkler heads, drip holes formed in the conduits, spray nozzles, or other fluid emitters. Each of the fluid-emitting devices may be fixed to one of the mobile towers 12, to the spans 14, or to any portion of the irrigation system 10. At least one of the fluid-emitting devices may comprise and/or be fluidly connected to a supply/shut-off valve for turning water on and off to the fluid-emitting devices and controlling how much water is provided to the fluid-emitting devices. The supply/shut-off valve may be actuated manually, electronically, remotely, and/or automatically by the control system 26, which may be physically and/or communicably coupled with the supply/shut-off valve. The conduits may be hoses or pipes fluidly linking the fluid-emitting devices with a fluid supply or source. A pump or any other actuation means may be used to force water or another fluid through the conduits to the fluid-emitting devices. In some embodiments of the invention, the conduits may further comprise a drop pipe fluidly connected to the conduits to allow for a drain and flushing of fluid in the conduits.

In some embodiments of the invention, a plurality of fluid supplies and/or supply hook-ups, such as hydrants, may be located at various locations relative to the field, and the conduits may be configured to attach to the nearest one of the fluid supplies. In another embodiment of the invention, the fluid supply may be a water canal or any other fluid source near the field. In this embodiment of the invention, the fluid delivery system may also comprise a pump configured to pump water from the canal through the conduits.

The constant speed motors 18 and the variable gear ratio transmissions 20 may be independently or cooperatively actuatable to drive the wheels 30 and thus drive the mobile towers 12 through the field and/or rotatably about the center pivot 22. Specifically, the motors 18 may drive the transmissions 20, and the transmissions 20 may drive the wheels 30 of the mobile towers 12. The motors 18 and/or transmissions 20 may further be coupled with a drive shaft, gears, belts, chains, sprockets, etc. to rotatably couple the motors 18 and/or the transmissions 20 with the wheels 30.

The motors may be constant speed electric motors or any constant speed motors known in the art. In some embodiments of the invention, the motors 18 may include integral or external relays so they may be turned on, off, and/or reversed. In some alternative embodiments of the invention, the motors 18 may be replaced with variable-speed motors having several speeds or equipped with variable speed drives.

The variable gear ratio transmissions 20 may be any automatic transmissions that can change seamlessly through a continuous range of effective gear ratios, as opposed to other mechanical transmissions that offer a finite number of gear ratios. The variable gear ratio transmissions 20 may include, for example, a continuously variable transmission (CVT), continuously variable planetary gear transmission, stepless transmission, variable pulley transmission, or the like. Advantageously, the use of a variable gear ratio transmission with a constant speed motor may reduce or eliminate electro-magnetic interference (EMI) or conducted emission noise from variable frequency drives used in some prior art irrigation systems, avoiding the need to filter this noise out of the irrigation system's power system. This may therefore simplify the electrical installation and make the irrigation system 10 easier to maintain.

The sensors 24 may each be mounted in fixed alignment with one of the spans 14. For example, the sensors 24 may each be fixed to one of the mobile towers 12, as in FIG. 1, in a fixed alignment with a corresponding one of the spans 14. Additionally or alternatively, one or more of the sensors 24 may be mounted to a boom extending from the mobile towers 12. In yet another alternative embodiment of the invention, the sensors 24 may each be fixed directly to one of the spans 14. The sensors 24 may be analog potentiometers, Hall Effect sensors, digital encoders, global positioning system (GPS) devices, solid-state sensors or microelectromechanical systems (MEMS) sensors, digital compasses, solid-state gyroscopes, accelerometers, and/or inertial measurement units (IMUs). For example, the digital compasses may include magnetometers for measuring the strength and/or direction of magnetic fields, and the IMUs may include angular and/or linear accelerometers and/or gyroscopes. Each of the sensors 24 may be configured to measure and/or calculate rotation and/or alignment of the spans 14 to which they are fixed. Upon initial setup of the irrigation system 10, the sensors 24 may be calibrated to a reference location and/or a reference direction relative to a geomagnetic field of Earth. The sensors 24 may include or be communicably coupled to wired or wireless communication devices or transmitters configured for sending the measurements from the sensors 24 to the control system 26 or external computers or control system configured for calculating or inferring position and/or alignment using the transmitted measurements.

The control system 26, as illustrated in FIG. 1, may be communicably coupled with the motors 18, transmissions 20, and/or sensors 24 associated with each of the spans 14 and/or mobile towers 12. Furthermore, the control system 26 may be communicably coupled with control elements of the fluid delivery system 16. Specifically, the control system 26 may be configured for calculating or inferring position and/or alignment of the spans 14 or mobile towers 12, controlling speeds of the mobile towers 12 via control of the transmissions 20, pivoting of the spans 14 about the center pivot 22, turning water on or off, etc. The control system 26 may comprise any number of processors, controllers, integrated circuits, programmable logic devices, or other computing devices and resident or external memory for storing data and other information accessed and/or generated by the irrigation system 10.

The control system 26 may be physically located on one of the mobile towers 12, on the center pivot 22, or remotely located and configured to transmit control signals to the various sensors 24, motors 18, transmissions 20, switches, and/or other actuation devices of the irrigation system 10. For example, a wireless antenna 32 may send and receive signals to and from an of the motors 18, transmissions 20, or sensors 24. Likewise, portions of the control system 26, memory, sensors 24, motors 18, and/or transmissions 20 need not be physically connected to one another since wireless communication among the various depicted components is permissible and intended to fall within the scope of the present invention. Furthermore, in some embodiments of the invention, only portions of the control system 26 and/or memory may be remotely located from the mobile towers 12, spans 14, and fluid delivery system 16 of the irrigation system 10. In some embodiments of the invention, the control system 26 may comprise a primary irrigation control system and a sensor control system that is communicably coupled with the primary irrigation control system. The primary irrigation control system and the sensor control system may be remotely located relative to each other and/or relative to the spans 14 and the mobile towers 12.

The control system 26 may implement a computer program and/or code segments to perform the functions and method described herein. The computer program may comprise an ordered listing of executable instructions for implementing logical functions in the control system 26. The computer program can be embodied in any computer readable medium for use by or in connection with an instruction execution system, apparatus, or device, and execute the instructions. In the context of this application, a "computer readable medium" can be any physical apparatus that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, or device. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM).

The memory may be integral with control system 26, stand-alone memory, or a combination of both. The memory may include, for example, removable and nonremovable memory elements such as RAM, ROM, flash, magnetic, optical, USB memory devices, and/or other conventional memory elements. The memory may store various data associated with the operation of the irrigation system 10, such as the computer program and code segments mentioned above, or other data for instructing irrigation system 10 to perform the steps described herein. Furthermore, the memory may store, for example, a sensor reference location or direction, sensor calibration information, geographic location of the center pivot 22, length of each span 14, distance between the sensors 24, field sizes, geographic coordinates of field boundaries, desired angles of spans relative to adjacent spans, amounts of water or liquid to dispense, sequence/timing and parameters for actuating the spans 14 to pivot, variable gear ratio transmission specifications and/or commands, etc. The various data stored within the memory may also be associated within one or more databases to facilitate retrieval of the information.

The control system 26 may use information received from the sensors 24 to determine if any of the spans 14 should be actuated to correct an undesired misalignment. For example, if one of the measured or calculated angles of one of the spans 14 is greater than a desired limit, the control system 26 may command one of the associated transmissions 20 to increase or decrease the speed of one of the mobile towers 12 to correct the alignment of that span. Specifically, this may cause the span joints and/or steerable wheels may be actuated (via a command signal from the control system 26) to pivot or rotate one of the spans 14 by an amount to correct alignment of at least one of the spans 14.

The control system 26 and its memory may be separately housed or jointly enclosed in or supported on a weatherproof housing for protection from moisture, vibration, and impact. Similarly, the control system 26 may be distributed through several different electronic modules, which in some embodiments of the invention may be integrated with one or more of the sensors 24. The housing may be constructed from a suitable vibration- and impact-resistant material, such as, for example, steel, plastic, nylon, aluminum, or any combination thereof and may include one or more appropriate gaskets or seals to make it substantially waterproof or resistant. The housing(s) may be positioned anywhere on the irrigation system 10.

In use, the sensors 24 may each be hard-mounted to one of the spans 14 and/or one of the mobile towers 12. Upon initial setup, the sensors 24 may be calibrated to a reference location, a reference axis, and/or a reference direction relative to a geomagnetic field of Earth (e.g., North, South, East, West). For example, the reference direction for control system 26 could be set such that each measured angle is taken with respect to an x-axis pointing east or aligned with a boundary of the field. The sensors 24 may return angle measurements to the control system 26 for use in calculating relative or absolute alignment and/or location of each of the spans 14 and/or the mobile towers 12. However, any method known in the art for determining amounts of span misalignment may be used without departing from the scope of the invention.

In some embodiments of the invention, the control system 26 may use the calculated alignment angles to determine an amount of correction required. For example, the mobile towers 12 may each be independently actuated, and one or more of the mobile towers 12 may be commanded to speed up or slowdown in order to correct excessive lag or lead detected via the sensors 24.

Figure 3:
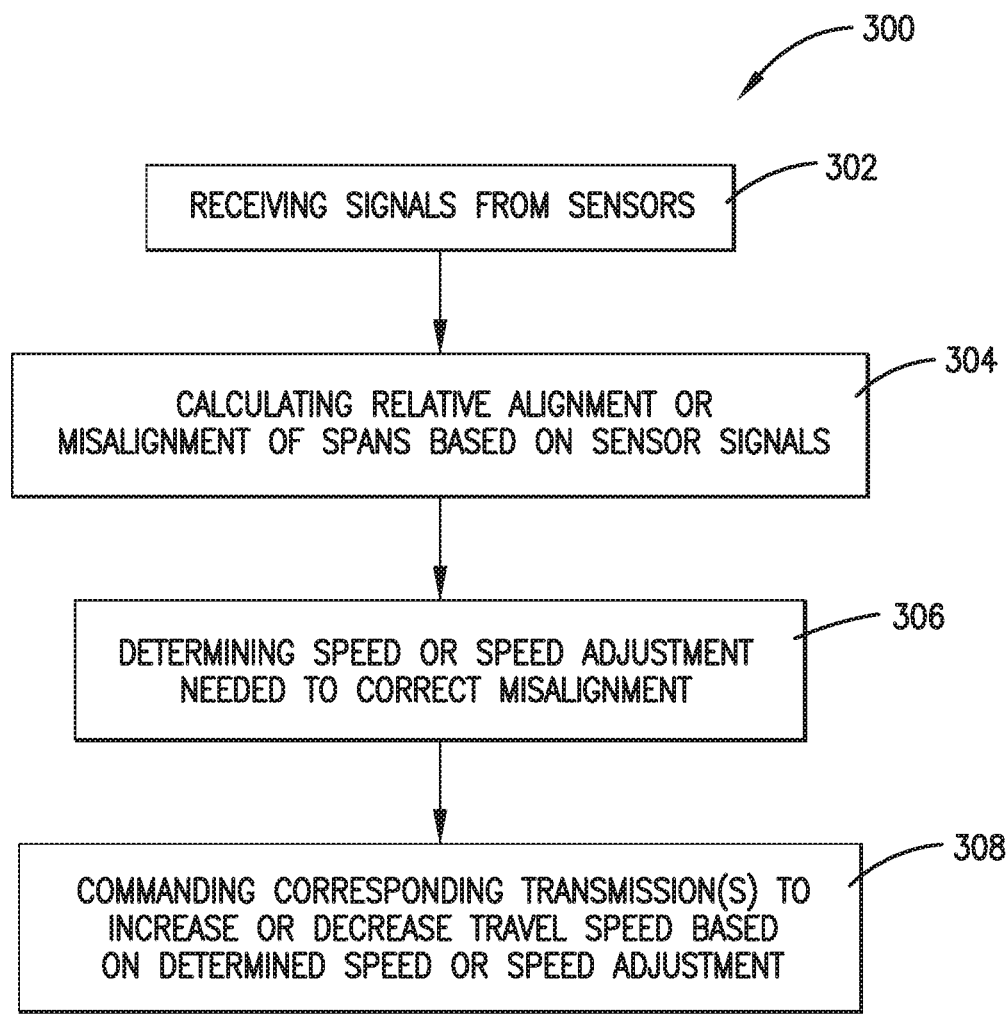
FIG. 3 is a flow chart illustrating a method of independently controlling speeds of the mobile towers via the variable gear ratio transmissions of FIG. 1 in accordance with an embodiment of the invention.

The flow chart of FIG. 3 depicts the steps of an exemplary method 300 of independently controlling speeds of the mobile towers 12 via the variable gear ratio transmissions 20 of the irrigation system 10 in more detail. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The method 300, as illustrated in FIG. 3, may comprise a step of receiving signals from the sensors 24, as depicted in block 302. As noted above, the signals from the sensors 24 may represent speed, heading, and/or an angle with respect to the reference direction relative to the geomagnetic field of Earth. Alternatively, signals from any other sensors known in the art for determining span misalignment on an irrigation system may be used without departing from the scope of the invention.

Then the method 300 may comprise a step of calculating relative alignment or misalignment of one or more of the spans 14 using the signals received from the sensors 24, as depicted in block 304. Using sensors to determine an amount of span misalignment is known in the art, as described, for example, in U.S. Pat. No. 8,763,937 titled "Methods and systems for aligning irrigation systems," U.S. 2015/0060580 titled "Solid-state span alignment and pivot positioning," and U.S. 2012/0305682 titled "Mobile tower alignment system and mechanism that allows programmed changes to alignment automatically," each of which are hereby incorporated by reference herein in their entirety.

The method 300 may then include the steps of determining a speed or speed adjustment for any one of the mobile towers based on the relative alignment or misalignment thereof, as depicted in block 306, and commanding the corresponding transmission(s) 20 to increase or decrease a travel speed of the corresponding mobile tower(s) 12, as depicted in block 308, based on the determined speed or speed adjustment. Specifically, the control system 26 may determine an angle of misalignment between any two of the spans 14 based on the measurements from the sensors 24, then command the corresponding one of the transmissions 20 to rotate the wheels 30 at speeds directly proportional to the angle of misalignment. For example, the larger an angle of misalignment between two of the spans 14, the faster corresponding output shafts of the corresponding transmission 20 turn, thus increasing the rotational speed of the wheels 30. The control system 26 thus keeps the alignment angle of the mobile towers 12 and their relative outboard spans 14 as close to zero as possible, while attempting to keep the mobile towers 12 moving at a substantially continuous speed. For a last or outer-most mobile tower on a pivot irrigation system, this speed may be selected based on a percentage value provided by the control system. Furthermore, the last or outer-most mobile tower may or may not include one of the sensors 24 thereon without departing from the scope of the invention.

Advantageously, independently driving the mobile tower speeds via the variable gear ratio transmissions may place less stress on the structure (e.g., the spans 14 and mobile towers 12) of the irrigation system 10. For example, the present invention may allow controlled starts and stops, with the acceleration and deceleration of the starts and stops programmed into the control system 26 at pre-defined ramp rates to minimize structural stress. This may also allow for more consistent water patterns due to the irrigation system 10 continuously moving instead of stopping and watering in place. Furthermore, as mentioned above, the present invention may reduce or eliminate EMI or conducted emission noise from variable frequency drives used in some prior art irrigation systems, thus avoiding the need to filter this noise out of the irrigation system's power system.

Although the invention has been described with reference to the embodiments illustrated in the attached drawing figures, it is noted that equivalents may be employed and substitutions made herein without departing from the scope of the invention as recited in the claims. For example, although the present invention is described herein for use with center-pivot irrigation systems, the present invention may also be used for driving mobile towers and spans of a lateral-move irrigation system. Relative alignment may refer to the alignment of the spans 14 relative to each other and absolute alignment may refer to alignment of the spans 14 relative to the reference direction with respect to the geomagnetic field of Earth. For example, the information received from the sensors 24 may be used by the control system 26 for keeping left and right sides of the lateral-move irrigation system more closely aligned.

Additionally, the present invention may be used on center-pivot or lateral-move irrigation systems having various types of spans, such as corner spans, pivoting turrets, or Z-fold corner spans, any of which may also be commanded to increase and/or decrease speed via a variable gear ratio transmission associated with a constant speed motor.

Having thus described various embodiments of the invention, what is claimed as new and desired to be protected by Letters Patent includes the following:

1. An irrigation system comprising:
    a plurality of mobile towers configured to travel in a field;
    a plurality of elongated rigid spans each extending between and connected to adjacent ones of the plurality of mobile towers;
    a plurality of motors each associated with one of the plurality of mobile towers;
    a plurality of variable gear ratio transmissions, each driven by one of the plurality of motors and each driving one of the plurality of mobile towers in a forward or rearward direction, the plurality of variable gear ratio transmissions each having an effective gear ratio and including at least one of continuously variable transmissions (CVTs), continuously variable planetary gear transmissions, stepless transmissions, and variable pulley transmissions;
    a plurality of sensors mounted on at least one of the plurality of spans and plurality of mobile towers, the plurality of sensors configured to measure alignment related attributes of the plurality of mobile towers, the alignment related attributes including at least one of acceleration, angular acceleration, angular rotation, heading, and an angle with respect to a fixed reference direction;
    an electronic controller communicably coupled with the plurality of variable gear ratio transmissions and the plurality of sensors, the electronic controller configured to send electronic command signals to at least one of the plurality of variable gear ratio transmissions such that the at least one of the plurality of variable gear ratio transmissions changes its effective gear ratio so as to independently increase or decrease speed of one or more of the plurality of mobile towers proportional to the alignment related attributes.

2. The irrigation system of claim 1, wherein the plurality of motors includes constant speed electric motors.

3. The irrigation system of claim 1, further comprising a plurality of wheels on which the plurality of mobile towers travel, wherein the plurality of wheels are rotatably attached to the plurality of mobile towers, wherein at least some wheels of the plurality of wheels are rotatably driven by the plurality of variable gear ratio transmissions.

4. The irrigation system of claim 1, wherein the plurality of sensors comprises at least one of analog potentiometers, Hall Effect sensors, digital encoders, global positioning system (GPS) devices, solid-state sensors, microelectromechanical systems (MEMS) sensors, digital compasses, solid-state gyroscopes, accelerometers, and inertial measurement units (IMUs).

5. The irrigation system of claim 1, further comprising a fluid delivery system having one or more conduits attached to or integrally formed with at least some of the plurality of spans and configured to output water from orifices formed therein or therethrough.

6. A center-pivot irrigation system comprising:
    a center pivot;
    a plurality of mobile towers configured to move about the center pivot;
    a plurality of elongated rigid spans each extending between and connected to adjacent ones of the plurality of mobile towers;
    a fluid delivery system comprising one or more conduits attached to or integrally formed with at least some of the plurality of spans and configured to output water from orifices formed therein or therethrough;
    a plurality of wheels, wherein each of the plurality of mobile towers travels on at least one of the plurality of wheels;
    a plurality of constant speed electric motors each associated with one of the plurality of mobile towers;
    a plurality of variable gear ratio transmissions, each having an effective gear ratio and being mechanically coupled between one of the plurality of constant speed electric motors and at least one of the plurality of wheels, wherein each of the plurality of variable gear ratio transmissions is configured to be driven by one of the plurality of constant speed electric motors and each configured to drive rotation of one of the plurality of wheels of one of the plurality of mobile towers to independently move the plurality of mobile towers in a forward or rearward direction, wherein the plurality of variable gear ratio transmissions includes at least one of continuously variable transmissions (CVTs), continuously variable planetary gear transmissions, stepless transmissions, and variable pulley transmissions;
    a plurality of sensors each mounted on one span of the plurality of spans or one mobile tower of the plurality of mobile towers and each configured to measure alignment-related attributes of adjacent spans including at least one of acceleration, angular acceleration, angular rotation, heading and an angle with respect to a fixed reference direction; and
    an electronic controller communicably coupled with the plurality of sensors and the plurality of variable gear ratio transmissions and configured to receive measurements from the plurality of sensors, determine an angle of alignment of adjacent spans relative to each other based on the alignment-related attributes measured by the plurality of sensors, and independently command at least one of the plurality of variable gear ratio transmissions to change its effective gear ratio so as to proportionally increase or decrease speed of at least one of the plurality of mobile towers according to the alignment related attributes to compensate for span misalignment.

7. The center-pivot irrigation system of claim 6, wherein the electronic controller determines an angle of misalignment between two of the plurality of spans based on the measurements from the plurality of sensors, wherein the electronic controller commands the plurality of variable gear ratio transmissions to rotate the plurality of wheels at speeds directly proportional to the angle of misalignment.

8. The center-pivot irrigation system of claim 6, wherein the plurality of sensors comprises at least one of analog potentiometers, Hall Effect sensors, digital encoders, global positioning system (GPS) devices, solid-state sensors, microelectromechanical systems (MEMS) sensors, digital compasses, solid-state gyroscopes, accelerometers, and inertial measurement units (IMUs).

\* \* \* \* \*